(12) United States Patent
Luo et al.

(10) Patent No.: US 11,283,259 B2
(45) Date of Patent: Mar. 22, 2022

(54) METHOD FOR ELECTROSTATIC DISCHARGE PROTECTION IN RECEIVER AND ASSOCIATED RECEIVER

(71) Applicant: Realtek Semiconductor Corp., HsinChu (TW)

(72) Inventors: Guo-Yuan Luo, Tainan (TW); Shou-Te Yen, Hsinchu County (TW); Yan-Jyun Chen, Changhua County (TW)

(73) Assignee: Realtek Semiconductor Corp., HsinChu (TW)

( * ) Notice: Subject to any disclaimer, the term of this patent is extended or adjusted under 35 U.S.C. 154(b) by 435 days.

(21) Appl. No.: 16/409,860

(22) Filed: May 12, 2019

(65) Prior Publication Data

US 2020/0185914 A1 Jun. 11, 2020

(30) Foreign Application Priority Data

Dec. 10, 2018 (TW) .................. 107144398

(51) Int. Cl.
*H02H 11/00* (2006.01)
*H01R 13/713* (2006.01)
*H02H 1/00* (2006.01)

(52) U.S. Cl.
CPC ......... *H02H 11/006* (2013.01); *H01R 13/713* (2013.01); *H02H 1/0007* (2013.01)

(58) Field of Classification Search
CPC .... H02H 1/0007; H02H 9/045; H02H 11/006; H01R 13/713

USPC .......................................................... 361/56
See application file for complete search history.

(56) References Cited

U.S. PATENT DOCUMENTS

2012/0036284 A1* 2/2012 Tao .................. H04N 21/44231
710/16
2018/0083623 A1* 3/2018 Li ............................ H04B 1/16

FOREIGN PATENT DOCUMENTS

TW  200908496       2/2009
TW  201212538 A1   3/2012

OTHER PUBLICATIONS

HDMI Licensing, LLC, "High-Definition Multimedia Interface Specification Version 1.4b", Oct. 11, 2011, p. 53-p. 55, USA.

* cited by examiner

*Primary Examiner* — Kevin J Comber
(74) *Attorney, Agent, or Firm* — Winston Hsu

(57) ABSTRACT

A method for electrostatic discharge protection in a receiver and associated receiver are provided. The receiver includes a reference voltage terminal, a detection terminal, at least one set of receiving terminals and at least one set of termination resistors. The method includes: according to a voltage level of the detection terminal, generating a detection result; and according to the detection result, controlling whether to configure said at least one set of termination resistors to be respectively coupled between said at least one set of receiving terminals and the reference voltage terminal.

9 Claims, 4 Drawing Sheets

METHOD FOR ELECTROSTATIC DISCHARGE PROTECTION IN RECEIVER AND ASSOCIATED RECEIVER

BACKGROUND OF THE INVENTION

1. Field of the Invention

The present invention is related to electrostatic discharge protection, and more particularly, to a method for electrostatic discharge protection in a receiver, and an associated receiver.

2. Description of the Prior Art

Household multimedia devices such as set-top boxes, multimedia players and audio/video (A/V) amplifiers have become widely used. In all these devices, A/V data may be inputted through a high definition multimedia interface (HDMI). Since an HDMI cable may be frequently plugged in and out (i.e. hot plugging), the probability of an HDMI port being damaged due to electrostatic discharge (ESD) is high.

ESD is one of the main factors that can cause electronic devices or electronic systems to be damaged. For example, at the moment a cable is plugged into an HDMI port, electrostatic charges accumulated on the cable may suddenly discharge causing internal circuit damage to the HDMI port; more seriously, this type of damage is usually permanent, and may affect functions of all the circuits. In order to prevent the aforementioned problems, a related art solution utilizes an additional ESD protection circuit for enhancing tolerance to ESD. This may increase additional costs, however, and additionally the tolerance to ESD is usually limited by specifications of the protection components. Thus, there is a need for a novel method and an associated architecture in order to enhance the tolerance to ESD.

SUMMARY OF THE INVENTION

An objective of the present invention is to provide a method for electrostatic discharge (ESD) protection in a receiver, and an associated receiver, to enhance the tolerance to ESD.

At least one embodiment of the present invention provides a method for ESD protection in a receiver, wherein the receiver may comprise a reference voltage terminal, a detection terminal, at least one set of receiving terminals and at least one set of termination resistors. The method comprises: according to a voltage level of the detection terminal, generating a detection result; and according to the detection result, controlling whether to configure said at least one set of termination resistors to be respectively coupled between said at least one set of receiving terminals and the reference voltage terminal.

At least one embodiment of the present invention provides a receiver, which comprises a reference voltage terminal, a detection circuit, at least one set of receiving terminals, at least one set of termination resistors and at least one set of switch circuits. The reference voltage terminal may be arranged to provide the receiver with power, and the aforementioned at least one set of receiving terminals may be arranged to receive data. The detection circuit is coupled to a detection terminal within the receiver, wherein the detection circuit may be arranged to generate a detection result according to a voltage level of the detection terminal. The aforementioned at least one set of switch circuits are coupled to the aforementioned at least one set of termination resistors, wherein the aforementioned at least one set of switch circuits may control whether to configure the aforementioned at least one set of termination resistors to be respectively coupled between said at least one set of receiving terminals and the reference voltage terminal according to the detection result.

The present invention method and associated device such as the receiver can obtain the detection result according to the voltage level of the detection terminal, and thereby determine whether the receiver has finished connecting with a transmitter through a cable, in order to control whether to configure the aforementioned at least one set of termination resistors to be respectively coupled between the aforementioned at least one set of receiving terminals and the reference voltage terminal. This can prevent the receiver from being permanently damaged due to ESD under a condition of the receiver having not finished the connection.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
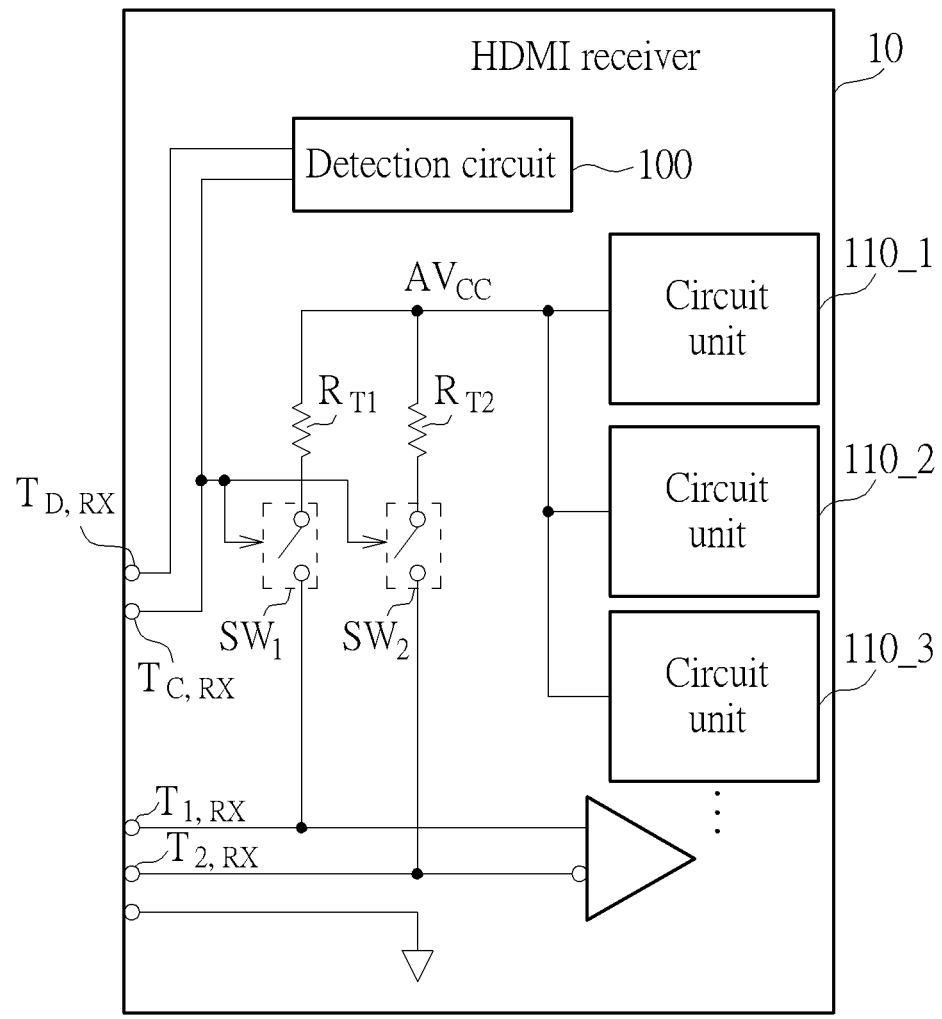
FIG. 1 is a diagram illustrating a receiver according to an embodiment of the present invention.

FIG. 1 is a diagram illustrating a receiver such as a high definition multimedia interface (HDMI) receiver 10 according to an embodiment of the present invention. As shown in FIG. 1, the HDMI receiver 10 may comprise a reference voltage terminal $AV_{CC}$, a detection circuit 100, at least one set of receiving terminals such as receiving terminals $T_{1,RX}$ and $T_{2,RX}$, at least one set of termination resistors such as resistors $R_{T1}$ and $R_{T2}$, and at least one set of switch circuits such as switch circuits $SW_1$ and $SW_2$. The receiving terminals $T_{1,RX}$ and $T_{2,RX}$ may comprise at least one set of transition minimized differential signaling (TMDS) channels for receiving data (e.g. audio/video data), and the reference voltage terminal $AV_{CC}$ may be arranged to provide one or more circuit units such as circuit units {110_1, 110_2, 110_3} within the HDMI receiver 10 with power, where the circuit units {110_1, 110_2, 110_3} may be regarded as related processing circuits arranged for operations of receiving the data (e.g. the audio/video data). In this embodiment, the detection circuit 100 is coupled to a detection terminal within the HDMI receiver 10 such as a terminal $T_{D,RX}$ (e.g. a 5V power receiving terminal) and a confirmation terminal such as a terminal $T_{C,RX}$ (e.g. a hot plug detect terminal), and the terminal $T_{C,RX}$ is further coupled to the aforementioned at least one set of switch circuits such as the switch circuits $SW_1$ and $SW_2$, where the detection circuit 100 may generate a detection result according to a voltage level of the terminal $T_{D,RX}$, and transmit or output the detection result through the terminal $T_{C,RX}$. For example, the voltage level of the detection terminal such as the terminal $T_{D,RX}$ may be regarded as a detection voltage, which may vary between voltage levels V1 and V2; for example, V1=0V and V2=5V, but the present invention is not limited thereto. In addition, the aforementioned at least one set of switch circuits may control whether to configure the resistors $\{R_{T1}, R_{T2}\}$ to be respectively coupled between the receiving terminals $\{T_{1,RX}, T_{2,RX}\}$ and the reference voltage terminal $AV_{CC}$. For example, the switch circuit $SW_1$ may be coupled between the resistor $R_{T1}$ and the receiving terminal $T_{1,RX}$, and the switch circuit $SW_2$ may be coupled between the resistor $R_{T2}$ and the receiving terminal $T_{2,RX}$, where the switch circuits $SW_1$ and $SW_2$ may be controlled to be conductive or non-conductive according to the detection result; in another example, the switch circuit $SW_1$ may be coupled between the resistor $R_{T1}$ and the reference voltage terminal $AV_{CC}$, and the switch circuit $SW_2$ may be coupled between the resistor $R_{T2}$ and the reference voltage terminal $AV_{CC}$, where the switch circuits $SW_1$ and $SW_2$ may be controlled to be conductive or non-conductive according to the detection result; but the present invention is not limited thereto. As mentioned above, various implementations of controlling whether to configure the resistors $\{R_{T1}, R_{T2}\}$ to be coupled between the receiving terminals $\{T_{1,RX}, T_{2,RX}\}$ and the reference voltage terminal $AV_{CC}$ should belong to the present invention.

Figure 2:
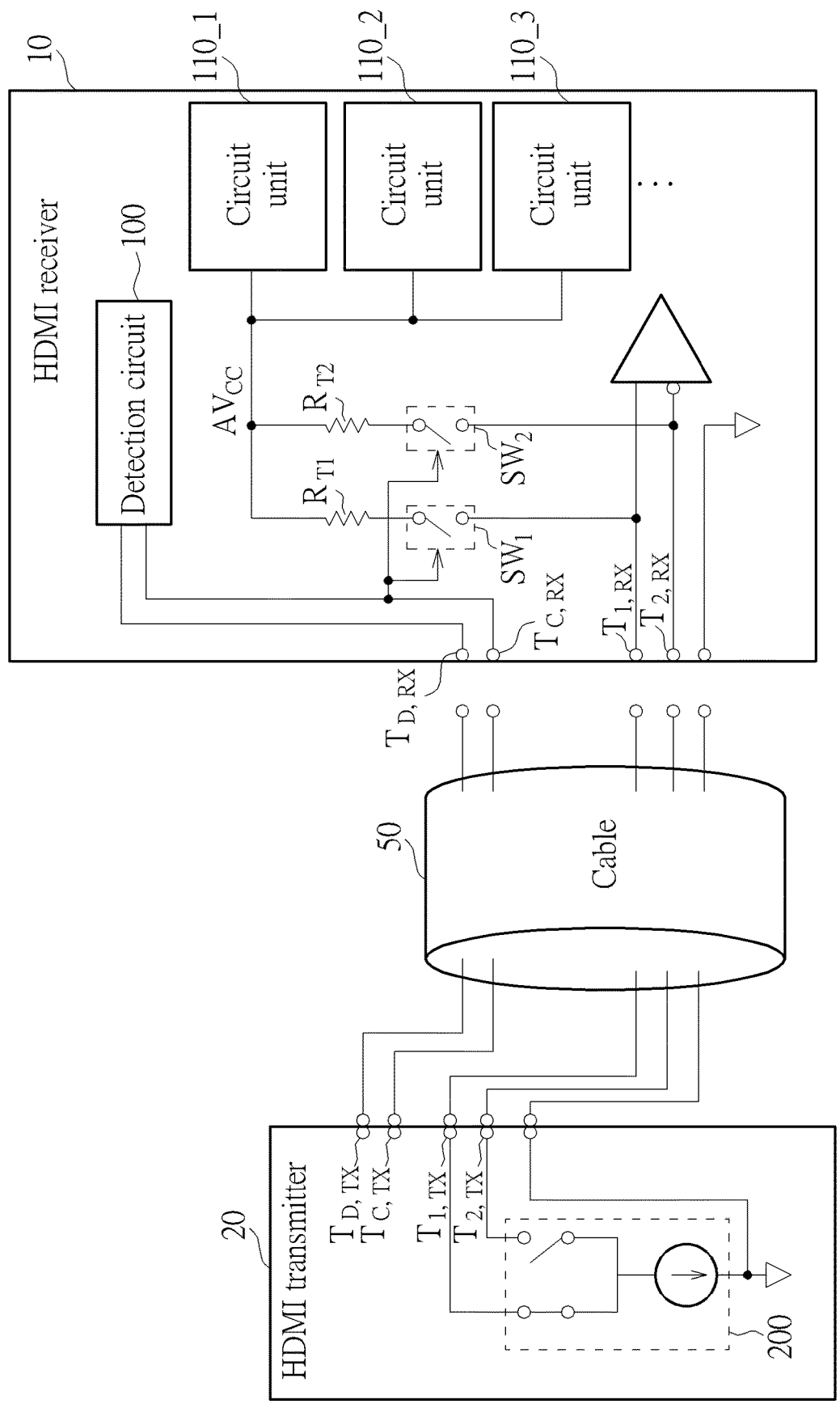
FIG. 2 is a diagram illustrating operations of the receiver shown in FIG. 1 which has not finished connecting with a transmitter through a cable according to an embodiment of the present invention.

FIG. 2 is a diagram illustrating operations of the HDMI receiver 10 which has not finished connecting with an HDMI transmitter 20 through a cable 50 according to an embodiment of the present invention. The HDMI transmitter 20 may comprise at least one differential signal generator such as a differential signal generator 200, which generates differential output signals according to differential image data. In this embodiment, since the HDMI receiver 10 has not finished connecting with the transmitter 20 through the cable 50, a voltage level (e.g. 5V) of a terminal $T_{D,TX}$ (e.g. a 5V power transmitting terminal) of the HDMI transmitter 20 cannot pull up the voltage level of the terminal $T_{D,RX}$ of the HDMI receiver 10 to a specific level (e.g. 5V) through the cable 50, and the voltage level of the terminal $T_{D,RX}$ is therefore less than the specific level or is not stably maintained at the specific level. At this moment, the detection circuit may generate a first detection result (e.g. a logic low signal) on the terminal $T_{C,RX}$ to indicate that this connection is not finished, where the first detection result may be an example of the detection result. Based on the first detection result, the HDMI receiver 10 may control the switch circuit $SW_1$ and $SW_2$ to be non-conductive, and electrostatic charges accumulated on the cable 50 will not be suddenly discharged which would damage the circuit units $\{110\_1, 110\_2, 110\_3\}$ at the moment the cable touches the receiving terminals $T_{1,RX}$ and/or $T_{2,RX}$. In addition, since this connection is not finished, the terminal $T_{C,TX}$ (e.g. a hot plug detect terminal) of the HDMI transmitter 20 will receive a signal (e.g. a logic low signal) indicating that the connection through the cable 50 has not finished, or that a signal (e.g. a logic high signal) indicating that the connection has finished cannot be received, and the HDMI transmitter 20 (such as the differential signal generator 200 therein) will not start performing audio/video data transmission.

Figure 3:
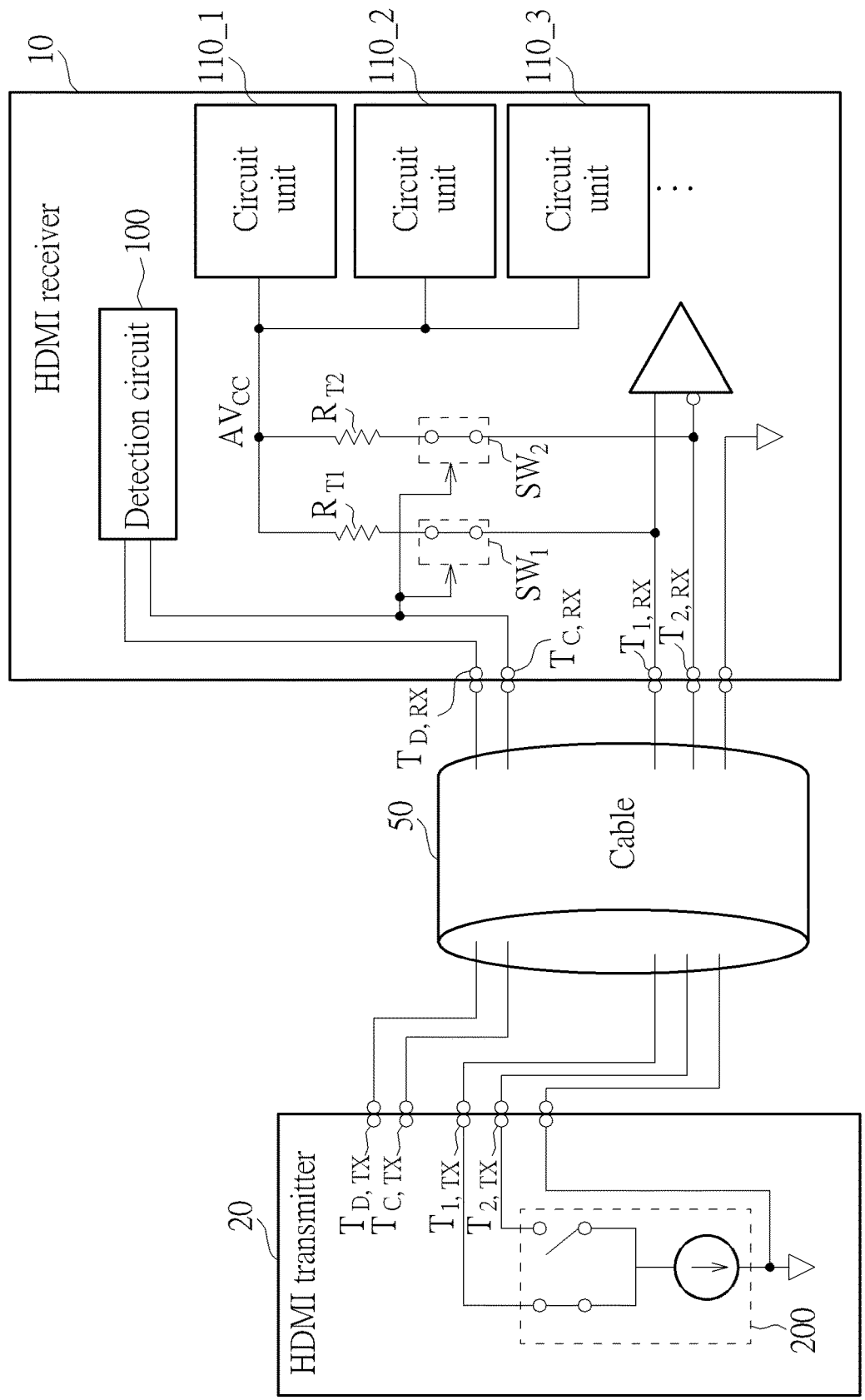
FIG. 3 is a diagram illustrating operations of the receiver shown in FIG. 1 which has finished connecting with a transmitter through a cable according to an embodiment of the present invention.

FIG. 3 is a diagram illustrating operations of the HDMI receiver 10 which has finished connecting with the HDMI transmitter 20 through the cable 50 according to an embodiment of the present invention. In this embodiment, since the HDMI receiver 10 has finished connecting with the HDMI transmitter 20 through the cable 50, which allows the voltage level (e.g. 5V) of the terminal $T_{D,TX}$ of the HDMI transmitter 20 to pull up the voltage level of terminal $T_{D,RX}$ of the HDMI receiver 10 to the specific level (e.g. 5V) through the cable 50, and the voltage level of terminal $T_{D,RX}$ is therefore able to stably be maintained at the specific level. At this moment, the detection circuit 100 may generate a second detection result (e.g. a logic high signal) on the terminal $T_{C,RX}$ to indicate that this connection is finished, where the second detection result may be another example of the detection result. Based on the second detection result, the HDMI receiver 10 may control the switch circuits $SW_1$ and $SW_2$ to be conductive (e.g. turn on the switch circuit $SW_1$ and $SW_2$ by the detection circuit 100), and thereby configure the resistors $\{R_{T1}, R_{T2}\}$ to be respectively coupled between the receiving terminals $\{T_{1,RX}, T_{2,RX}\}$ and the reference voltage terminal $AV_{CC}$. In addition, since this connection is finished, the terminal $T_{C,TX}$ of the HDMI transmitter 20 may receive a signal (e.g. a logic high signal) corresponding to the connection being finished through the cable 50, and the HDMI transmitter 20 (such as the differential signal generator 200 therein) will start to perform the audio/video data transmission through the transmitting terminals $T_{1,TX}$ and $T_{2,TX}$.

Figure 4:
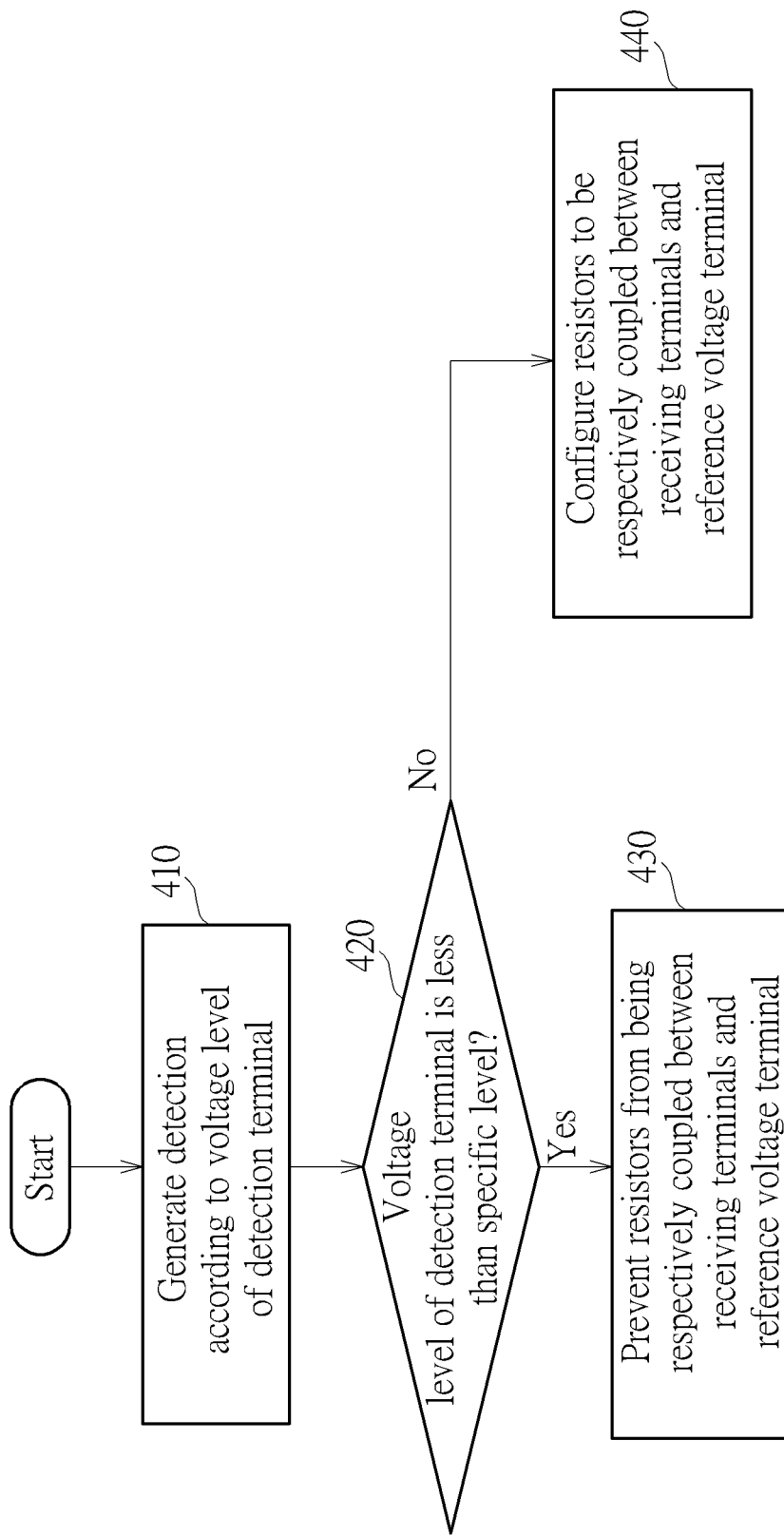
FIG. 4 is a flowchart illustrating a method for ESD protection according to an embodiment of the present invention.

FIG. 4 is a flowchart illustrating a method for ESD protection according to an embodiment of the present invention. The steps are detailed below.

In Step 410, the detection circuit 100 may generate a detection result (such as the aforementioned detection result, e.g. the first detection result or the second detection result) according to a voltage level of a detection terminal (e.g. the terminal $T_{D,RX}$).

In Step 420, when the detection result indicates that the voltage level of the detection terminal (e.g. the terminal $T_{D,RX}$) is less than a specific level (such as the aforementioned specific level, e.g. 5V), the flow enters Step 430; otherwise, the flow enters Step 440.

In Step 430, the switch circuits $SW_1$ and $SW_2$ may prevent the resistors $\{R_{T1}, R_{T2}\}$ from being respectively coupled between the receiving terminals $\{T_{1,RX}, T_{2,RX}\}$ and the reference voltage terminal $AV_{CC}$; for example, the switch circuits $SW_1$ and $SW_2$ are controlled to be non-conductive.

In Step 440, the switch circuits $SW_1$ and $SW_2$ may configure the resistors $\{R_{T1}, R_{T2}\}$ to be respectively coupled between the receiving terminals $\{T_{1,RX}, T_{2,RX}\}$ and the reference voltage terminal $AV_{CC}$; for example, the switch circuits $SW_1$ and $SW_2$ are controlled to be conductive.

In addition, the above embodiments are illustrated by one set of receiving terminals (such as the receiving terminals $T_{1,RX}$ and $T_{2,RX}$), one set of termination resistors (such as the resistors $R_{T1}$ and $R_{T2}$) and one set of switch circuits (such as the switch circuits $SW_1$ and $SW_2$) for brevity, but the present invention is not limited thereto. For example, the HDMI receiver 10 may comprise multiple sets of receiving terminals and corresponding termination resistors and switch circuits, and the present invention method can be applied to each set of receiving terminals within the HDMI receiver 10 and corresponding termination resistors and switch circuits by analogy.

Briefly summarized, the present invention method and associated device (e.g. the HDMI receiver 10) can prevent fragile circuit units (such as the circuit units $\{110\_1, 110\_2, 110\_3\}$) within the HDMI receiver 10 from being damaged by ESD without introducing any side effect or in a way that is less likely to introduce side effects. For example, at the moment the cable touches the receiving terminals $T_{1,RX}$ and/or $T_{2,RX}$, since the voltage level of the terminal $T_{D,RX}$ has not been pulled up to the specific level, the switch circuits SW$_1$ and SW$_2$ are non-conductive, and the electrostatic charges accumulated on the cable 50 will be discharged through other paths that have higher tolerance to ESD, rather than entering the HDMI receiver 10 through the termination resistors which would cause damage to the circuit units {110_1, 110_2, 110_3}.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for electrostatic discharge (ESD) protection in a receiver, wherein the receiver comprises a reference voltage terminal, a detection terminal, at least one set of receiving terminals and at least one set of termination resistors, said at least one set of receiving terminals comprises a first receiving terminal and a second receiving terminal configured to receive differential signals, said at least one set of termination resistors comprises a first termination resistor and a second termination resistor, and the method comprises:
   according to a voltage level of the detection terminal, generating a detection result; and
   according to the detection result, controlling whether to configure said at least one set of termination resistors to be respectively coupled between said at least one set of receiving terminals and the reference voltage terminal;
   wherein:
      in response to the detection result indicating that the voltage level of the detection terminal is less than a specific level, preventing the first termination resistor from being coupled between the first receiving terminal and the reference voltage terminal, and preventing the second termination resistor from being coupled between the first receiving terminal and the reference voltage terminal; and
      in response to the detection result indicating that the voltage level of the detection terminal has been pulled up to the specific level, configuring the first termination resistor to be coupled between the first receiving terminal and the reference voltage terminal, and configuring the second termination resistor to be coupled between the second receiving terminal and the reference voltage terminal.

2. The method of claim 1, wherein in response to the receiver having not finished connecting with a transmitter through a cable, the voltage level of the detection terminal is less than the specific level.

3. The method of claim 1, wherein in response to the receiver having finished connecting with a transmitter through a cable, the transmitter pulls up the voltage level of the detection terminal to the specific level through the cable.

4. The method of claim 1, wherein the receiver is a high definition multimedia interface (HDMI) receiver.

5. The method of claim 4, wherein said at least one set of receiving terminals comprises at least one set of transition minimized differential signaling (TMDS) channels.

6. A receiver, comprising:
   a reference voltage terminal, arranged to provide the receiver with power;
   a detection circuit, coupled to a detection terminal within the receiver, arranged to generate a detection result according to a voltage level of the detection terminal;
   at least one set of receiving terminals, comprising a first receiving terminal and a second receiving terminal arranged to receive differential signals;
   at least one set of termination resistors, comprising a first termination resistor and a second termination resistor; and
   at least one set of switch circuits, coupled to said at least one set of termination resistors, wherein said at least one set of switch circuits control whether to configure said at least one set of termination resistors to be respectively coupled between said at least one set of receiving terminals and the reference voltage terminal according to the detection result;
   wherein:
      when the detection result indicates that the voltage level of the detection terminal is less than a specific level, the first termination resistor is not coupled between the first receiving terminal and the reference voltage terminal, and the second termination resistor is not coupled between the first receiving terminal and the reference voltage terminal; and
      when the detection result indicates that the voltage level of the detection terminal has been pulled up to the specific level, the first termination resistor is coupled between the first receiving terminal and the reference voltage terminal, and the second termination resistor is coupled between the second receiving terminal and the reference voltage terminal.

7. The receiver of claim 6, wherein:
   when the receiver has not finished connecting with a transmitter through a cable, the voltage level of the detection terminal is less than the specific level; and
   when the receiver has finished connecting with the transmitter through the cable, the transmitter pulls up the voltage level of the detection terminal to the specific level through the cable.

8. The receiver of claim 6, wherein the receiver is a high definition multimedia interface (HDMI) receiver.

9. The receiver of claim 8, wherein said at least one set of receiving terminals comprises at least one set of transition minimized differential signaling (TMDS) channels.

* * * * *